July 28, 1942.  R. J. KIMMICK  2,291,238
METHOD AND APPARATUS FOR PRODUCING PELLICLES
Filed Nov. 30, 1937
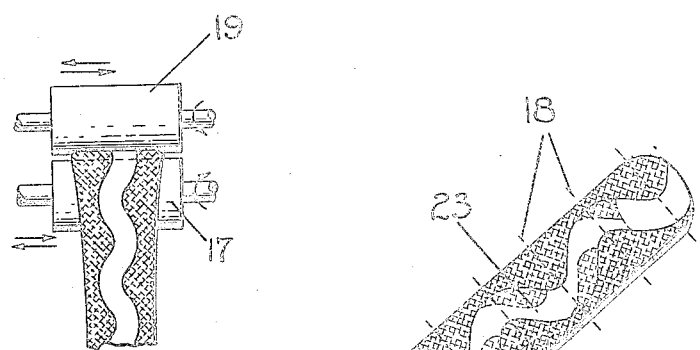
Fig. 1.
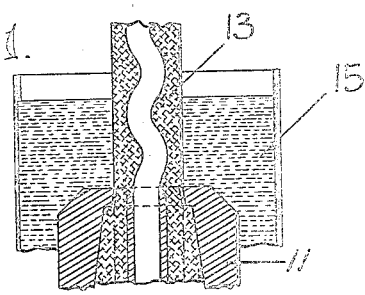
Fig. 2.
Fig. 3.
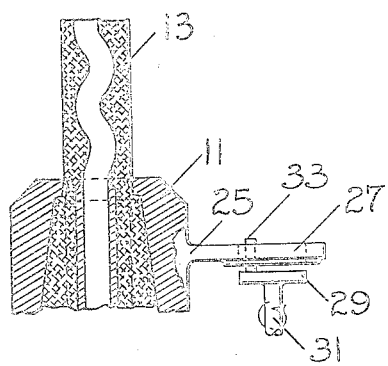
INVENTOR.
Richard J. Kimmick
BY
ATTORNEY Patented July 28, 1942

2,291,238

UNITED STATES PATENT OFFICE 2,291,238

METHOD AND APPARATUS FOR PRODUCING PELLICLES

Richard J. Kimmick, Buffalo, N. Y., assignor to E. I. du Pont de Nemours & Company, Wilmington, Del., a corporation of Delaware Application November 30, 1937, Serial No. 177,188

13 Claims. (Cl. 18—14)

This invention relates to the continuous production of non-fibrous, cellulosic, pellicular structures, and more particularly, it relates to the continuous production of such pellicular structures having wavy or spiral designs incorporated therein. The invention will be described in terms of seamless cellulosic tubes regenerated from viscose although it is understood that it is equally applicable to non-fibrous, cellulosic structures generally and in particular to non-fibrous, cellulosic, pellicular structures in the form of tubes, strips and the like which may be prepared by the use of an apparatus for the extrusion of a freely flowable cellulosic solution into a coagulating bath.

Recently, seamless tubes of regenerated cellulose have come into use as ornamental and decorative ribbons or strips for the manufacture of millinery and other purposes. Similar tubes of larger diameter have been in use as substitutes for animal casings on sausages. They have also been used as decorative and protective sleeves over various articles of manufacture upon which they may be applied in the gel state and, when allowed to stand, shrink down tightly over the articles due to the evaporation of their contained water.

It has been customary to impart various pleasing and ornamental effects to tubes of this kind by incorporating various materials in the viscose from which they are cast. Until recently the continuous production of ornamental tubing was confined to the production of tubes which were entirely opaque, entirely transparent, or of mottled appearance. In the Vautier and Fays U. S. Patent 2,141,776, there is a disclosure of a method and apparatus for the continuous production of striped cellulosic tubing by passing a plurality of freely flowing, differently colored, or opaque and transparent, cellulosic solutions into an extrusion die having an annular opening, maintaining the solutions separated from each other to a point closely adjacent the coagulating bath, joining said solutions in an annular stream of substantially uniform cross section to form a bond therebetween, and immediately thereafter passing the stream into the coagulating bath. The striped tubing produced by the method of U. S. Patent 2,141,776 comprises colored or plain transparent, or opaque stripes parallel to one another and parallel to the axis of the tubing.

It has now been discovered that a striped tubing can be produced in which the stripes have a wavy or spiral shape.

It is therefore an object of this invention to produce a striped, pellicular structure from freely flowable film-forming solutions in which structure the stripes have a wavy or spiral contour.

It is another object of this invention to provide a method and apparatus for producing a striped, pellicular structure from freely flowable, film-forming solutions in which structure the stripes have a wavy or spiral contour.

Other objects of the invention will appear hereinafter.

The objects of the invention can be accomplished, in general, by causing a relative rotary motion between the extrusion die and the extruded coagulated tubing. This may be done by imparting to the extrusion die a reciprocating, rotary motion, meanwhile restraining the extruded tube from rotation at some point above the die, or by imparting a reciprocating motion to the tubing at some distance above a stationary extrusion die. The striped tubing will retain sharp and distinct lines of division between the transparent and opaque, or the differently colored cellulosic sections, and the stripes will have a wavy or spiral contour with respect to the tubing. The number and optical appearance of these stripes is limited only by the number of different viscose mixtures which are fed into the extrusion die. The variously shaped stripes which can be obtained are unlimited, being governed by the relative velocity of extrusion and the nature of the relative rotary motion between the extrusion die and the coagulated tubing.

The details of the invention and the advantages thereof will become more clearly apparent by reference to the following description taken in connection with the accompanying illustrations of certain embodiments thereof, and in which:

Figure 1 is a vertical, elevational view, partly in section, showing one form of the invention;

Figure 2 is a perspective view of the striped tubing made in accordance with the present invention;

Figure 3 is a vertical, elevational view, partly in section, of a modified form of apparatus.

Referring to Figure 1 of the drawing, reference numeral 11 designates an extrusion die of the type described in U. S. Patent 2,141,776. This contains a plurality of internal partitions for keeping separated the plurality of viscose solutions which are to be extruded to form a striped tubing. The cellulosic solution as it passes from the extrusion die, comes in contact with a coagulating bath 15 where it is instantly set up as a striped tubing. The tubing passes upwardly over a head roll 17 which is rotated in the direction of the arrow. A second roll 19, driven in the direction of the arrow shown on its shaft, is spaced a slight distance from the head roll 17 so that the tubing will be contacted by both rolls 17 and 19. Inasmuch as the tubing is still in the gel state, the rolls must not be positioned too closely to each other so as to prevent crushing or otherwise damaging the tube. The rolls 17 and 19 are longitudinally reciprocated in opposite directions. That is, as roll 17 is longitudinally moved to the left, the roll 19 is longitudinally moved to the right. This reciprocatory movement of the two rolls causes the tubing to be rolled therebetween. The rolling rotary movement of the tubing 13 is transmitted back to the mouth of the extrusion die where the liquid cellulosic solution is being coagulated. Depending upon the period and amplitude of the reciprocatory movement of the rolls 17 and 19, a wavy design of any desired frequency and amplitude will be imparted to the striped tubing. It will be obvious that the same effect can be obtained by reciprocating only one of the rolls 17 or 19.

The striped tubing shown in Figure 2 of the drawing is composed of an orange colored opaque body portion 21 and a transparent, wavy stripe 23. After passing between the head rolls 17 and 19, the tubing may be passed through additional coagulating, regenerating, washing, bleaching and softening baths in the usual manner for the production of cellulosic pellicles.

Referring to Figure 3 of the drawing, the extrusion die 11 is provided with a projecting member 25 containing a slot 27. A disc 29, positioned on a rotating shaft 31, is arranged adjacent the projecting member 25. An eccentric pin 33 on the disc 29 is positioned within the slot 27 to give the die 11 an oscillating, rotary motion upon rotation of the shaft 31. In this case only one head roll is necessary. The head roll 17 shown is rotated in the direction of the arrow without reciprocation of any kind. The relative rotary motion between the die and the coagulated tubing will produce the same effect as by the use of the device shown in Figure 1.

If desired, the die 11 may be rotated continuously in the same direction so as to impart a continuous spiral design in one direction in the tubing. In this case, however, it will be necessary to modify the die of U. S. Patent 2,141,776 by providing the same with passages for the cellulosic solutions through a hollow shaft instead of at the sides of the same.

By operating in accordance with the above described method and apparatus, it is found that the reciprocating movement of the rollers in Figure 1 or the rotary movement of the die in Figure 3 will cause a shifting of the direction of extrusion only at the point where the cellulosic solution passes from the die. There is no further distortion of the tubing during its vertical travel to the head roll. It is to be noted that all of the stripes in the tubing will have the same configurations since this twisting motion of the tubing causes a uniform displacement about the circumference of the tube.

If a true continuous spiral effect is desired in relatively short tubes, this may be obtained by cutting at predetermined points such as at the lines 18 in Figure 2. These cuts are so positioned that the severed section contains only that portion of the wave in which there is no reversal of direction. The frequency of these curves may be varied to coincide with the length of band desired.

Despite the fact that the opaque and transparent viscoses are joined while in the liquid state and despite the fact that the extruded stream is reciprocally displaced before any coagulation occurs, no intermingling occurs. Even when the displacement is relatively large and the reversal of the direction rapid, there is a sharp boundary line and the stripes remain the same width throughout the length of the tubing.

The frequency and amplitude of the waves may be varied widely. The amplitude may be small and the frequency high or low. Similarly, the amplitude may be large and frequency high or low.

While this description has been confined to smooth simulated spirally shaped stripes, it is apparent that stripes of a wide variety of shapes may be produced. The major portion of the stripe may be straight with discontinuous curved portions of any desired amplitude and frequency, dependent only on the displacement imparted to the viscose as it is extruded. Similarly, the wavy stripe need not be symmetrical as the rate of the relative rotation between the die and the coagulated tubing may be variable or may be different in opposite directions. Similarly, by well known mechanical means a certain cycle of the relative rotational movements might be maintained so that successive waves would be differently shaped.

Many other variations are possible within the scope of this invention. Any number of differently colored, opaque or transparent, bright or dull, metallic appearing or other contrasting appearing stripes can be produced. These stripes may be all of the same width, they may be of varying widths or some may be very wide and some very narrow. Combinations may include stripes, all transparent, all opaque, all metallic, all colored or innumerable combinations of any two or more. Use may be made of any desired colors, dyes, pigments, metallic particles or the like to obtain any desired effect.

Although this invention has been described in terms of seamless cellulosic tubes regenerated from viscose, it is apparent that it is equally applicable to the manufacture of pellicular structures generally by the extrusion of any plastic material. It may be employed for the manufacture of pellicular structures from cellulose derivatives generally, such as cellulose esters and ethers, from regenerated cellulose, gelatin, resins and any other plastic material capable of forming pellicular structures upon extrusion.

Since it is apparent that various changes and modifications may be made from the above description without departing from the nature and spirit thereof, it is understood that the invention is not to be limited thereto except as set forth in the appended claims.

I claim:

1. In a method for the production of striped tubing by passing a plurality of substantially instantly coagulable film-forming solutions of different optical appearances in side by side relationship through an annular extrusion die wherein said solutions are brought together immediately prior to their contact with a coagulating medium, the step which comprises imparting a relative reciprocating rotary movement between the die and the coagulated striped pellicle.

2. In a method for the production of striped tubing by passing a plurality of substantially instantly coagulable film-forming solutions of different optical appearances in side by side relationship through an annular extrusion die wherein said solutions are brought together immediately prior to their contact with a coagulating medium, the step which comprises imparting a rolling or twisting movement to the coagulated striped tubing sufficient to cause relative motion between the coagulated and uncoagulated material where the uncoagulated material is being coagulated.

3. In a method for the production of striped tubing by passing a plurality of substantially instantly coagulable film-forming solutions of different optical appearances in side by side relationship through an annular extrusion die wherein said solutions are brought together immediately prior to their contact with a coagulating medium, the step which comprises imparting a reciprocating rotary motion to said die sufficient to cause relative motion between the coagulated and uncoagulated material where the uncoagulated material is being coagulated.

4. In an apparatus for the production of striped tubing, an extrusion die for extruding a plurality of substantially instantly coagulable film-forming solutions of different optical appearances in side by side relationship into a coagulating medium, means for conveying said tubing from said coagulating medium, and means for imparting a relative reciprocating rotary motion between said die and the coagulated striped tubing and in the zone of coagulation.

5. In an apparatus for the production of striped tubing, an extrusion die for extruding a plurality of substantially instantly coagulable film-forming solutions of different optical appearances in side by side relationship into a coagulating medium, means for conveying said tubing from said coagulating medium, and means for imparting a rolling or twisting motion to said striped tubing as it is conveyed from said coagulating medium and in the zone of coagulation.

6. In an apparatus for the production of striped tubing, an extrusion die for extruding a plurality of substantially instantly coagulable film-forming solutions of different optical appearances in side by side relationship into a coagulating medium, and a pair of oppositely reciprocating, spaced rollers in the path of the coagulated tubing for conveying said tubing from said coagulating medium and imparting a rolling or twisting motion to said striped tubing.

7. In an apparatus for the production of striped tubing, an extrusion die for extruding a plurality of substantially instantly coagulable film-forming solutions of different optical appearances in side by side relationship into a coagulating medium, means for conveying said tubing from said coagulating medium, and means for imparting a reciprocatory rotary motion to said die in such a manner that there is relative motion between the coagulated and uncoagulated material.

8. In an apparatus for the production of striped tubing, an extrusion die for extruding a plurality of substantially instantly coagulable film-forming solutions of different optical appearances in side by side relationship into a coagulating medium, means for conveying said tubing from said coagulating medium, and means for oscillating said die in such a manner that there is relative motion between the coagulated and uncoagulated material.

9. The method of forming striped tubular pellicles from freely-flowing, film-forming, instantly coagulable cellulosic solutions of different optical appearances which comprises joining the solutions into a tubular stream to form a bond therebetween, immediately thereafter passing the stream into a coagulating bath and imparting relative motion about an axis in the tubular stream between the uncoagulated tubular stream and coagulated tubes at the locus of the coagulation by oscillating the coagulated tubing.

10. In a method for the production of striped tubing comprising diametrically opposite clear sections and colored intermediate sections by passing a plurality of substantially instantly coagulable film-forming solutions of different optical appearances in side by side relationship through a curved extrusion die wherein said solutions are brought together immediately prior to their contact with a coagulating medium, the step which comprises imparting a relative reciprocating rotary movement between the die and the coagulated striped tubing.

11. In a method for the production of striped tubing comprising diametrically opposite clear sections and opaque intermediate sections by passing a plurality of substantially instantly coagulable film-forming solutions of different optical appearances in side by side relationship through an arcuate extrusion die wherein said solutions are brought together immediately prior to their contact with a coagulating medium, the step which comprises imparting a reciprocating rotary motion to said die sufficient to cause relative motion between the coagulated and uncoagulated material where the uncoagulated material is being coagulated.

12. The method of forming striped tubular pellicles from freely-flowing, film-forming, instantly coagulable cellulosic solutions of different optical appearances which comprises joining the solutions into a tubular stream to form a bond therebetween, immediately thereafter passing the stream into a coagulating bath and imparting relative motion about an axis in the tubular stream between the uncoagulated tubular stream and coagulated tubes at the locus of the coagulation by movement of the coagulated tube.

13. The method of forming striped tubular pellicles from freely-flowing, film-forming, instantly coagulable cellulosic solutions of different optical appearances which comprises joining the solutions into a tubular stream to form a bond therebetween, immediately thereafter passing the stream into a coagulating bath and imparting relative motion about an axis in the tubular stream between the uncoagulated tubular stream and coagulated tubes at the locus of the coagulation by oscillating the uncoagulated tubular stream.

RICHARD J. KIMMICK.